United States Patent
Woodward et al.

(10) Patent No.: US 10,200,121 B2
(45) Date of Patent: Feb. 5, 2019

(54) REACHABILITY DETERMINATION IN WAVELENGTH DIVISION MULTIPLEXING NETWORK BASED UPON FIBER LOSS MEASUREMENTS

(71) Applicant: AT&T Intellectual Property I, L.P., Atlanta, GA (US)

(72) Inventors: Sheryl Woodward, Holmdel, NJ (US); Kathleen Tse, Holmdel, NJ (US); Martin Birk, Holmdel, NJ (US); Angela Chiu, Holmdel, NJ (US); Balagangadhar Bathula, Lawrenceville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/623,240

(22) Filed: Jun. 14, 2017

(65) Prior Publication Data

US 2018/0367214 A1  Dec. 20, 2018

(51) Int. Cl.
*H04B 10/00* (2013.01)
*H04B 10/079* (2013.01)
(Continued)

(52) U.S. Cl.
CPC ..... *H04B 10/07953* (2013.01); *H04B 10/071* (2013.01); *H04B 10/07957* (2013.01); *H04B 10/2507* (2013.01); *H04Q 11/0066* (2013.01); *H04Q 2011/0073* (2013.01); *H04Q 2011/0083* (2013.01); *H04Q 2011/0086* (2013.01)

(58) Field of Classification Search
USPC ................................... 398/25–38
See application file for complete search history.

(56) References Cited

U.S. PATENT DOCUMENTS

| | | | | |
|---|---|---|---|---|
| 5,594,581 A | * | 1/1997 | Alphonsus | H04B 10/032 398/175 |
| 6,122,096 A | * | 9/2000 | Fatehi | G02B 6/2932 359/337.21 |

(Continued)

OTHER PUBLICATIONS

Robert D. Doverspike et al., "Optical network management and control." Proceedings of the IEEE vol. 100 Issue 5 (Mar. 8, 2012). pp. 1092-1104.

(Continued)

*Primary Examiner* — Agustin Bello

(57) ABSTRACT

Devices, computer-readable media and methods are disclosed for determining reachability for a wavelength connection in a telecommunication network. For example, a processor deployed in a telecommunication network may calculate a fiber loss on a link in the telecommunication network using optical power measurements and determine that a destination node of a wavelength connection is not reachable via a path that includes the link based upon the fiber loss of the link that is calculated. In one example, the determining is based upon a number of links in the path, an effective fiber loss for each link in the path, a penalty for nodes in the path, and an acceptable loss value. The processor may further perform a remedial action in response to determining that the destination node of the wavelength connection is not reachable via the path.

20 Claims, 4 Drawing Sheets

(51) Int. Cl.
*H04B 10/2507* (2013.01)
*H04Q 11/00* (2006.01)
*H04B 10/071* (2013.01)

(56) References Cited

U.S. PATENT DOCUMENTS

| | | | | |
|---|---|---|---|---|
| 7,792,430 B2* | 9/2010 | Deguchi | ............... | H04B 10/03 398/1 |
| 7,899,326 B2* | 3/2011 | Shi | ............... | H04J 14/0227 370/248 |
| 8,180,219 B2* | 5/2012 | Bardalai | ............... | H04L 12/66 370/352 |
| 8,374,502 B2 | 2/2013 | Bernstein et al. | | |
| 8,396,359 B2* | 3/2013 | Zhou | ............... | H04Q 11/0062 398/15 |
| 8,655,173 B2 | 2/2014 | Bernstein et al. | | |
| 8,750,284 B2 | 6/2014 | Zi et al. | | |
| 8,831,423 B2 | 9/2014 | Gerstel et al. | | |
| 8,879,907 B2* | 11/2014 | Goto | ............... | H04B 10/07 398/147 |
| 9,054,944 B2 | 6/2015 | Wang et al. | | |
| 9,236,972 B2 | 1/2016 | Lee et al. | | |
| 9,270,366 B2 | 2/2016 | Lee et al. | | |
| 9,319,132 B2* | 4/2016 | Ishii | ............... | H04B 10/07953 |
| 9,450,865 B2 | 9/2016 | Bernstein et al. | | |
| 9,485,553 B2 | 11/2016 | Magri et al. | | |
| 9,509,435 B2* | 11/2016 | Shinohara | ............ | H04J 14/0257 |
| 9,634,762 B2* | 4/2017 | Ishii | ............... | H04B 10/07953 |
| 2003/0016414 A1* | 1/2003 | Solheim | ............... | H04J 14/0283 398/82 |
| 2006/0002716 A1* | 1/2006 | Guy | ............... | H04J 14/0227 398/175 |
| 2006/0177221 A1* | 8/2006 | Furst | ............... | H04B 10/506 398/38 |
| 2008/0080867 A1* | 4/2008 | Itoh | ............... | H04J 14/0221 398/97 |
| 2008/0225723 A1 | 9/2008 | Lee et al. | | |
| 2009/0116833 A1* | 5/2009 | Shimizu | ............... | H04J 14/0227 398/2 |
| 2010/0014859 A1* | 1/2010 | D'Alessandro | ..... | H04J 14/0284 398/48 |
| 2010/0290780 A1* | 11/2010 | Teipen | ............... | H04B 10/27 398/27 |
| 2011/0091208 A1* | 4/2011 | Mayor | ............... | H04B 10/07 398/38 |
| 2011/0236021 A1* | 9/2011 | Presi | ............... | H04B 10/2587 398/67 |
| 2011/0268439 A1* | 11/2011 | Gerstel | ............... | H04L 45/124 398/34 |
| 2012/0141139 A1* | 6/2012 | Bakhru | ............... | H04B 10/272 398/158 |
| 2012/0170943 A1* | 7/2012 | Claisse | ............... | H04B 10/2935 398/200 |
| 2013/0010612 A1 | 1/2013 | Lee et al. | | |
| 2013/0084068 A1* | 4/2013 | Togo | ............... | H04J 14/0227 398/49 |
| 2013/0177311 A1* | 7/2013 | Trnkus | ............... | H04J 14/0227 398/28 |
| 2013/0243421 A1* | 9/2013 | Goto | ............... | H04B 10/073 398/25 |
| 2013/0343752 A1* | 12/2013 | Graves | ............... | H04Q 11/0005 398/38 |
| 2014/0086570 A1* | 3/2014 | Rider | ............... | H04J 14/0257 398/2 |
| 2014/0133849 A1* | 5/2014 | Ishii | ............... | H04B 10/07953 398/26 |
| 2014/0161443 A1* | 6/2014 | Zhou | ............... | H04J 14/021 398/27 |
| 2014/0308040 A1* | 10/2014 | Sekiya | ............... | H04J 14/0269 398/79 |
| 2015/0104166 A1* | 4/2015 | Patel | ............... | H04Q 11/0066 398/5 |
| 2015/0296278 A1* | 10/2015 | Liu | ............... | H04J 14/0267 398/50 |
| 2016/0072575 A1* | 3/2016 | Al Sayeed | .......... | H04J 14/0289 398/2 |
| 2016/0105252 A1* | 4/2016 | Bouda | ............... | H04J 14/0257 398/49 |
| 2016/0182982 A1 | 6/2016 | Schmidtke et al. | | |
| 2016/0204893 A1* | 7/2016 | Wei | ............... | H04J 14/0257 398/79 |

OTHER PUBLICATIONS

Gianluca Meloni et al., "PCE architecture for flexible WSON enabling dynamic rerouting with modulation format adaptation." European Conference and Exposition on Optical Communications. Optical Society of America (2011). 3 Pages.

Shoichiro Oda et al., "Demonstration of an autonomous, software controlled living optical network that eliminates the need for pre-planning", Optical Fiber Communications Conference and Exhibition (OFC) (Mar. 20, 2016). 3 Pages.

"OTN for MSOs", Fujitsu Network Communications Inc. (2013). 8 Pages. Downloaded Aug. 23, 2017. https://www.fujitsu.com/us/Images/OTNforMSO.pdf.

"Metro Open ROADM Network Model Version 1.1", OpenROADM.org (Jul. 21, 2016). 45 Pages. Downloaded Aug. 23, 2017. https://0201.nccdn.net/4_2/000/000/002/4ae/Open-ROADM-Network-Model-Whitepaper-v1-1.pdf.

* cited by examiner

REACHABILITY DETERMINATION IN WAVELENGTH DIVISION MULTIPLEXING NETWORK BASED UPON FIBER LOSS MEASUREMENTS

The present disclosure relates generally to telecommunication network operations, e.g., in a wavelength division multiplexing (WDM) network, and more particularly to devices, computer-readable media, and methods for determining reachability for a wavelength connection in a telecommunication network.

BACKGROUND

Path computation entities (PCE's) are widely used in dense-wavelength-division-multiplexed (DWDM) networks to determine how to route wavelength connections between node pairs. To compute the path, the PCE needs to know if two nodes are "reachable"—whether the DWDM network can support a connection between them with sufficient optical-signal-to-noise ratio (OSNR) to maintain good performance over the lifetime of the system. If the path is not "reachable" then additional resources may be utilized to reliably carry data between the two nodes.

SUMMARY

In one example, the present disclosure discloses a device, computer-readable medium, and method for determining reachability for a wavelength connection in a telecommunication network. For example, a processor deployed in a telecommunication network may use optical power measurements to calculate a fiber loss on a link in the telecommunication network and determine that a destination node of a wavelength connection is not reachable via a path that includes the link based upon the fiber loss of the link that is calculated. In one example, the determining is based upon a number of links in the path, an effective fiber loss for each link in the path, a penalty for nodes in the path, and an acceptable loss value. The processor may further perform a remedial action in response to determining that the destination node of the wavelength connection is not reachable via the path.

In another example, the present disclosure discloses a device, computer-readable medium, and method for determining reachability for a wavelength connection in a telecommunication network. For example, a processor deployed in a telecommunication network may receive a request to establish a wavelength connection between a first node and a second node in the telecommunication network. In one example, the request includes information on an expected duration of the wavelength connection. The processor may further determine whether the second node is reachable from the first node using an acceptable loss value, where the acceptable loss value is based upon the expected duration of the wavelength connection. The processor may then configure the telecommunication network based upon whether the second node is determined to be reachable from the first node.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
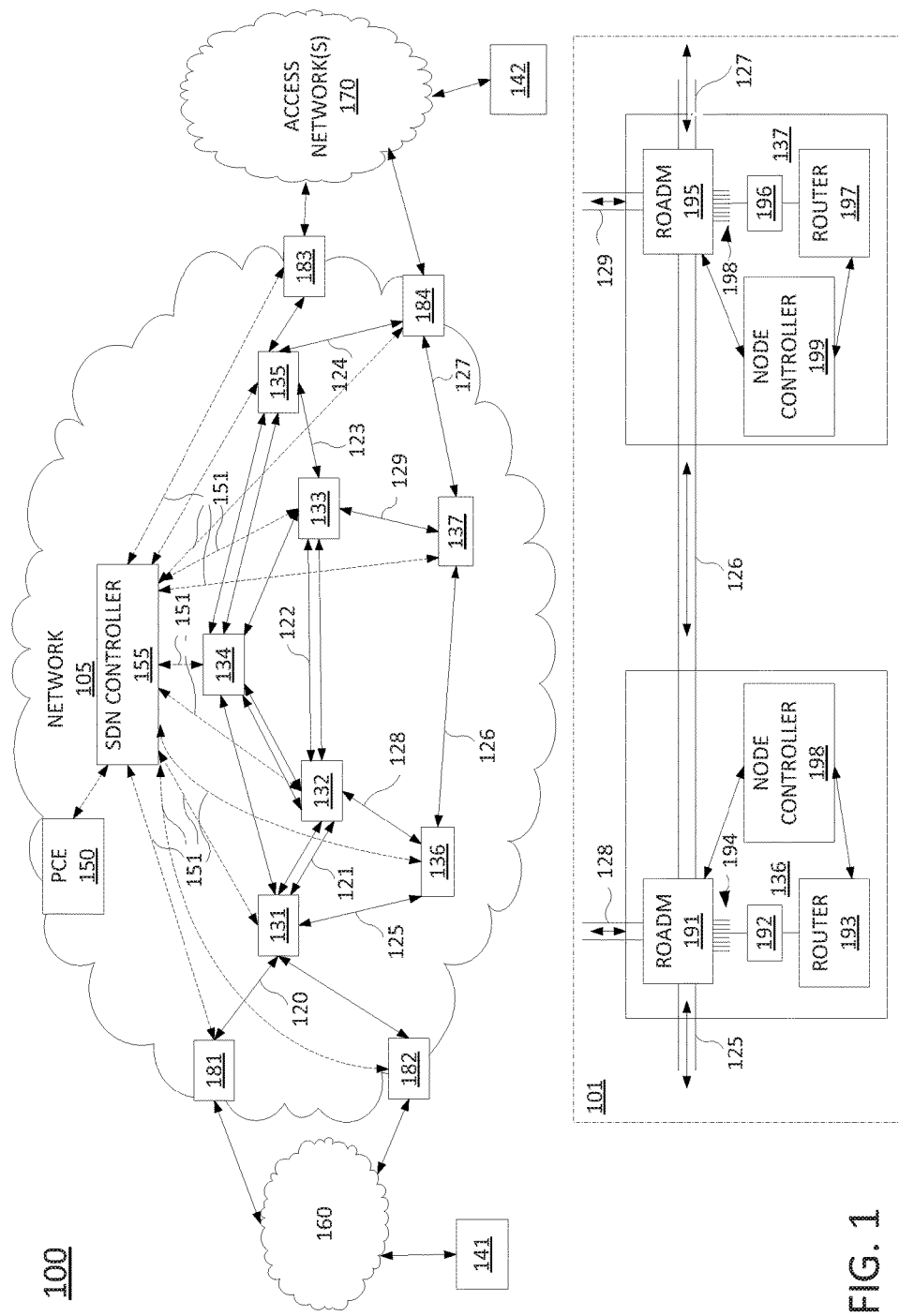
FIG. 1 illustrates an example system related to the present disclosure.

The present disclosure broadly discloses devices, computer-readable media and methods for determining reachability for a wavelength connection in a telecommunication network. For instance, path computation entities (PCEs) are widely used in wavelength division multiplexing (WDM) networks to determine how to route wavelength connections between node pairs. At the optical layer, the PCE needs to know if two nodes are "reachable"—whether the WDM network can support a wavelength connection between them with sufficient optical signal-to-noise ratio (OSNR) to maintain acceptable performance over the lifetime of the system without optical-electronic-optical (OEO) regeneration. The PCE may also utilize a fixed margin to ensure that as the system ages, acceptable operation will continue.

Examples of the present disclosure support a mixture of persistent connections (meant to perform reliably over the network's lifetime) and ephemeral connections, e.g., those that will remain up and running for the duration of a maintenance or other disruptive event (e.g., a surge in traffic, or to provide restoration in the event of a network failure). In accordance with the present disclosure, different methods/calculations are used to decide the reach of a persistent connection and that of an ephemeral, or non-persistent connection. Since the latter is not intended to operate for the lifetime of the equipment, in one example a reach determination is performed with current wavelength distribution (rather than assuming all wavelengths will be in use) and little or no margin. In another example, the reach for a non-persistent connection is determined by establishing a wavelength connection, and discovering whether or not the pre-forward error correct (FEC) BER is acceptable. For instance, optical transponders at nodes in the network have built-in capability to measure the (pre-FEC) BER.

In one example, a candidate path of the wavelength connection may be determined using a Dijkstra algorithm, such as a shortest path first (SPF) algorithm, or a similar initial candidate path selection algorithm, such as least cost routing (LCR) (e.g., where measured fiber loss and/or reachability are not cost factors). Test data may be sent over the candidate path and if the pre-FEC BER is acceptable, the wavelength connection may be made active. Otherwise, a second candidate path may be set up and similarly tested for pre-FEC BER. However, in another example, if the pre-FEC BER is not acceptable on the initial candidate path, the optical transceivers may be adjusted to reduce the transmission bitrate, a regenerator may be added to the path, or both.

For persistent connections, rather than calculating the optical signal-to-noise ratio (OSNR), a formula can be used for determining reachability that is based upon: loss measurements made over time on fibers/links along a path, loss penalties for traversing nodes in the path (e.g., ROADMs and/or optical amplifiers), and an acceptable loss value (e.g., a maximum single-span loss), which may include a margin. For example, one or more candidate paths for the persistent wavelength connection may be determined using Least Cost Routing (LCR) using any number of "cost" factors other than reachability, such as available wavelengths, a number of links in the path, link lengths, the regions traversed by links of the path, a monetary cost factor based upon the links and/or node equipment that would be utilized by the path, current loads of links and/or nodes in the path, current wavelength occupancies of the links in the path (e.g., a density of a number of wavelengths in use and/or a percentage or number of unassigned wavelengths available), and so forth. A candidate path may then be considered for a reachability determination.

As an alternative, the reachability determination may be used as one of several cost factors in path selection, e.g., using LCR or the like. For instance, if an intended destination node of a path is determined to not be reachable via the reachability determination, the cost factor may be weighted so highly that the candidate path is discarded as a possibility by the PCE, regardless of any other factors. Alternatively, or in addition, the reachability determination may comprise a cost factor where the difference between the calculation for the path and the acceptable loss value is weighted. In other words, paths for which the calculation is within an acceptable range, but closer to the acceptable loss value may have a factor weighted such that the path is a less highly ranked by the PCE as compared to a path for which the calculation indicates that the path will comply with the acceptable loss value by a wider range.

In one example, the reachability for a (proposed) persistent wavelength connection may be determined with the following calculation:

$$\left\| 10 \times \left[ \log_{10} \left\{ \sum_{i=1}^{n} (1/l_i) \right\} \right] \right\| + (n-1)h \leq \|R\| \quad \text{Equation 1}$$

where n is the number of links in the path, $l_i$ is the fiber loss for each link i, h is the loss (or "loss penalty") for nodes in the path, and R is the acceptable loss value (e.g., the acceptable loss value for a single link path). In one example, each node in the path comprises a reconfigurable optical add-drop multiplexer (ROADM) and/or an optical amplifier.

In another example, the determining that the destination node of a wavelength connection is not reachable is based upon:

$$\left\| 10 \times \left[ \log_{10} \left\{ \sum_{i=1}^{n} (1/l_i) \right\} \right] \right\| + mh_{AMP} + (n-1)h_{ROADM} \leq \|R\| \quad \text{Equation 2}$$

where n is the number of links in the path, m is the number of amplifiers in the path, $l_i$ is the fiber loss for each link i, $h_{AMP}$ is the loss (or "loss penalty") for optical amplifiers in the path, $h_{ROADM}$ is the loss (or "loss penalty") for ROADMs in the path, and R is the acceptable loss value.

Thus, Equation 1 or Equation 2 can be used to calculate whether a path can support a wavelength connection without regeneration. This can be done before the network is built using conservative estimates for the parameters R, h, $h_{ROADM}$, $h_{AMP}$, and estimates of the loss of each span, b. For instance, the loss on each span may be estimated based on a length of the span and an assumed loss per distance (e.g., in decibels per kilometer). The loss penalties for node equipment, h, $h_{ROADM}$, $h_{AMP}$, may be estimated based upon operations of similar systems, a different portion of the network or system, from manufacturers' stated parameters, and so on. Furthermore, a pre-deployment analysis can be used to determine whether or not amplifiers should be installed at sites between ROADM nodes.

In one example, the following initial transmission system parameters are assumed: initial maximum end of life (EoL) single-span loss (30 dB), initial margin (3 dB), amplifier minimum gain (11 dB) (in one example, loss between amplifiers is increased to this value using a variable optical attenuator if the fiber loss is below this value), ROADM loss penalty $h_{ROADM}$ (1 dB), amplifier loss penalty $h_{AMP}$ (0.5 dB) required "reachability" $\|R\|$ (27 dB, e.g., 30 dB EoL single-span loss minus 3 dB margin). Before fiber loss calculations for a link are available, the following fiber plant parameters may be used to estimate the fiber loss $l_i$ for each link: distance-based fiber loss (0.3 dB/km), connector loss (0.5 dB).

However, once the network is in operation, fiber loss of each link, $l_i$ can be calculated from optical power measurements and these values of $l_i$ may then be used for reach determinations for persistent connections, e.g., using Equation 1 or Equation 2. For instance, $l_i$ for a link may be the average of fiber loss over a number of sample measurements. In one example, the average may be based upon recent measurements, e.g., fiber loss measurements on the link from the last week, last day, last hour, etc. Alternatively, or in addition, a weighted average of the fiber loss measurements may be utilized, where more recent measurements are weighted more heavily, and older measurements are given decreasing weights.

Similarly, in one example, the loss calculations from optical power measurements may be replaced with an "effective loss," which may be based on statistics and trends seen in the fiber loss data over long-term measurements. For instance, the margin may be adjusted in dependence on fiber loss measurements over the previous year. In one example, fiber loss measurements may be weighted on a time-dependent loss curve. In one example, a conservative margin is used by considering the worst loss data over the previous year (or other time periods, such as three months, six months, etc.), and the associated loss difference between the current loss and the worst loss data. In another example, an average margin is used by considering the average loss data over the previous year or other time periods, and the associated loss difference between the current loss and the average loss data. If the historical loss data is not available, the effective loss may be calculated using loss data on fibers from the same cable, loss data on other fibers used by the system, loss estimates based on known properties of the fiber, and loss data from other systems with the same or similar equipment. In addition, in one example, the present disclosure uses fiber loss measurements taken over time to forecast how much the loss is expected to increase over time, and to use this information to set or adjust the effective loss based on a projected EoL fiber loss.

Similarly, the margin and/or R may be modified based on either loss calculations, PMD measurements, or on other measurements such as pre-FEC measurements made on a wavelength channel. These modifications may be based on measurements made on a particular network (or fraction of a network) or similar measurements made on similar networks. The value may take into account the wavelength on which the pre-FEC BER was measured and how many wavelengths were present at the of the measurement. In one example, the margin may also depend on the number of wavelengths already used in the system.

The following may underlie the basis of Equations 1 and 2 above. The dominant noise impairment on a link may comprise amplified spontaneous emission (ASE). However, traversing a ROADM or an optical amplifier may introduce an additional impairment $h_{ROADM}$, $h_{AMP}$, respectively. A path is deemed acceptable (i.e., the destination node is reachable) if the impairments are constrained to an acceptable limit. For a single span, if the total loss is less than R, the OSNR is within acceptable range, where R is an EoL single-span loss minus a margin. For an n-hop path, the following may apply:

$$\text{Signal} \cong \prod_{i=1}^{n} (l_i \times G_i)S_o = S_o \qquad \text{Equation 3}$$

where $G_i$ is the amplifier gain of an optical amplifier, which may be standalone or integrated within a ROADM, and $S_o$ is the signal transmitted via the path. The center term is equal to the term on the right since the amplifier gain in each link is tuned to offset the fiber loss in the link, and:

$$\text{Noise} \cong \sum_{i=1}^{n} (ASE_i) \propto \sum_{i=1}^{n} (G_i - 1) \cong \sum_{i=1}^{n} (G_i) = \sum_{i=1}^{n} (1/l_i), \qquad \text{Equation 4}$$

where $ASE_i$ is the amplified spontaneous emission for a link, i.

For a 1-hop path, the destination is reachable if the effective single span loss satisfies the following:

$$\|10\| \times [\log_{10}\{l_1\}]\| \le \|R\| \qquad \text{Equation 5:}$$

Given Equation 5, it follows that an n-hop path is "reachable" when Equation 1 or Equation 2 above is satisfied. It should also be noted that the foregoing is provided by way of example only. In other words, in other, further, and different examples, variations of these equations and parameters may be utilized in accordance with the present disclosure. As just one example, Equation 2 may be modified to account for different loss penalties for different types of amplifiers and/or ROADMs (e.g., different vendors' equipment) along the path. For instance, h, $h_{ROADM}$, $h_{AMP}$ may be different for each fiber/link i, and for each different type of equipment. Thus, these and other modifications are all contemplated within the scope of the present disclosure.

In one example, a fiber loss may be measured using an optical time domain reflectometer (OTDR) and/or fiber loss test set (FLTS). For instance, these measurement components may be integrated within nodes (e.g., ROADM nodes) in the network and may be used to measure fiber loss on various fibers/links in the network. In one example, fiber loss may be calculated from optical power measurements performed on the wavelength used to carry the optical supervisory channel (OSC) which carries network maintenance information. In another example, fiber loss may be calculated from optical power measurements performed on wavelengths that are not in use/not assigned for traffic. In one example, the fiber loss for each link $l_i$ may be based upon measurements over a variety of wavelengths on a link. However, as discussed further below, in one example, after fiber loss measurements have been accumulated, different values for $l_i$ for the same link may be used with respect to different wavelengths.

In one example, pre-FEC BER may also be monitored for links in the network, and for different wavelengths on the same link. For instance, as mentioned above, optical transponders at nodes in the network have built-in capability to measure the (pre-FEC) BER. In addition, there are often spare transponders in the network which are either not in use for an active wavelength connection, or are in place for rapid failure recovery (e.g., for transponder failure, other equipment failures, or cable cuts). Similarly, links and paths in the network may be monitored for polarization mode dispersion (PMD), e.g., using one or more PMD probes or analyzers using techniques such as wavelength scanning, interferometry, Stokes parameter evaluation, etc., which may also be integrated at one or more nodes in the network. In one example, PMD is assessed using ephemeral connections or using unassigned wavelengths that are not in active use. For example, PMD varies over wavelength and time, and the time variation can be quite slow. In addition, persistent wavelength connections are always at the same wavelength. Therefore, it may be difficult to use PMD readings for persistent connections to assess fiber quality.

The measured and/or calculated values for fiber loss, BER, and/or PMD can be used individually or collectively to improve the assumptions used for R, h, $h_{ROADM}$, $h_{AMP}$. For example, even in the absence of transmission impairments, the pre-FEC BER may include low-level errors (i.e., such errors may be present even when two transponders are placed back-to-back, the noise may be due to imperfect filtering, laser phase noise, electronic noise, etc.). However, if the working wavelength connections all have pre-FEC BER that is far lower than required, then the values used for R, h, $h_{ROADM}$, $h_{AMP}$ might be too conservative. For instance, the system may test different values for R (and/or the margin or single link path acceptable loss) to determine how low R (and/or the margin or single link path acceptable loss) can be reduced before FEC is unable to correct all errors, or to determine how often, on average, FEC is unable to adequately correct all errors, using progressively lower values for R (and/or the margin or single link path acceptable loss). It should be noted, however, that for adjusting R (and/or the margin, single link path acceptable loss, h, $h_{ROADM}$, $h_{AMP}$, and so forth), fiber loss measurements are better than using measurements on the OSNR (or pre-FEC BER) to forecast the OSNR (or pre-FEC BER); since the OSNR will have a ceiling (and the pre-FEC BER will have a floor) until values fall below that ceiling (or come above the floor) it is difficult to see when or if they are likely to deteriorate. Thus, the dynamic range of the reachability calculation for persistent connections is improved by fitting the parameters to the fiber loss data and in some cases measured pre-FEC BER data and/or PMD data that is available.

In one example, an application of regression analysis may also reveal wavelength dependence, and how it varies in the presence of other channels. Thus, after the network has been deployed for operation, the reachability determination, e.g., per Equation 1 or Equation 2 may use different values for R, h, $h_{ROADM}$, $h_{AMP}$ depending upon the wavelength of the intended path being analyzed. Similarly, some cables experience loss due to macro bends, frequent cable cuts, or other mechanisms, while on others the loss is very constant. Therefore, some paths may call for the use of a larger margin when calculating the end of life acceptable loss, acceptable loss value, R, and/or more margin to ensure long-term reliability than other paths. For instance, when a regression analysis determines a fiber type and/or an installation type dependence upon fiber loss, (and in some examples, differences in measured pre-FEC BERs), a different value for R may be used per Equation 1 or Equation 2 above. For example, a higher margin may be used on a path where a fiber/link is buried in conduit than on a path with all direct-buried cable installations. The latter is more likely to have problems with macro-bends, thereby increasing the loss which is revealed through the accumulated fiber loss measurements. In another example, the margin may be higher (and/or R may be lower) for paths traversing areas in a same climate zone as fibers for which greater fiber losses (and in some examples, greater pre-FEC BERs) have been measured (e.g., areas subject to freezing temperatures). In another example, regression analysis may be applied to loss data (and/or pre-FEC BER data) for fibers/links with ROADMs and/or amplifiers from different vendors to reveal performance differences among the different types of equipment. For instance, in one example, when sufficient data has been gathered, a different value for $h_{ROADM}$ may be used for a first vendor's equipment versus a second vendor's equipment.

In another example, variability in fiber loss measurements is used to adjust R and/or the margin. For instance, an acceptable loss value (inclusive of margin) may be initially set based upon fiber loss measurements, BER measurements, PMD measurements, and/or other factors. In one example, the measurements may be taken from at least one of: other links in a same geographic area as one or more links of a candidate path, other links in a same temperature zone as the one or more links of the path, or other links having a same deployment type as the one or more links of the path, and so forth. However, the acceptable loss value may be reduced when variability on links of a candidate path is higher (or increased when variability on the links has declined as compared to less recent measurements on the links in the path). Thus, these and other aspects of the present disclosure are discussed in greater detail below in connection with the examples of FIGS. 1-3.

To aid in understanding the present disclosure, FIG. 1 illustrates an example system 100 comprising a plurality of different networks in which examples of the present disclosure for determining reachability for a wavelength connection in a telecommunication network may operate. The overall communications system 100 may include any number of interconnected networks which may use the same or different communication technologies. As illustrated in FIG. 1, system 100 may include a network 105, e.g., a core telecommunication network. In one example, the network 105 may comprise a backbone network, or transport network, such as an Internet Protocol (IP)/Multi-Protocol Label Switching (MPLS) network, where label switched paths (LSPs) can be assigned for routing Transmission Control Protocol (TCP)/IP packets, User Datagram Protocol (UDP)/IP packets, and other types of protocol data units (PDUs) (broadly "traffic"). However, it will be appreciated that the present disclosure is equally applicable to other types of data units and network protocols. For instance, the network 105 may utilize IP routing (e.g., without MPLS). Furthermore, network 105 may comprise multiple networks utilizing different protocols, all utilizing a shared underlying WDM infrastructure (fibers, amplifiers, ROADMs, etc.). In this regard, it should be noted that as referred to herein, "traffic" may comprise all or a portion of a transmission, e.g., a sequence or flow, comprising one or more packets, segments, datagrams, frames, cells, PDUs, service data unit, bursts, and so forth. The particular terminology or types of data units involved may vary depending upon the underlying network technology. Thus, the term "traffic" is intended to refer to any quantity of data to be sent from a source to a destination through one or more networks. In addition, as used herein, the terms "configured" and "reconfigured" may refer to programming or loading a computing device with computer-readable/computer-executable instructions, code, and/or programs, e.g., in a memory, which when executed by a processor of the computing device, may cause the computing device to perform various functions. With respect to ROADMs, "configured" and "reconfigured" may refer to instructions to adjust a wavelength selective switch (WSS) to route different wavelengths to different fibers/links and/or to different add/drop ports, to adjust an optical transceiver to send or receive at a particular bit/rate, and the like.

In one example, the network 105 may be in communication with networks 160 and networks 170. Networks 160 and 170 may comprise wireless networks (e.g., an Institute of Electrical and Electronics Engineers (IEEE) 802.11/Wi-Fi network and the like), a cellular access network (e.g., a Universal Terrestrial Radio Access Network (UTRAN) or an evolved UTRAN (eUTRAN), and the like), a circuit switched network (e.g., a public switched telephone network (PSTN)), a cable network, a digital subscriber line (DSL) network, a metropolitan area network (MAN), an Internet service provider (ISP) network, a peer network, and the like. In one example, the networks 160 and 170 may include different types of networks. In another example, the networks 160 and 170 may be the same type of network. The networks 160 and 170 may be controlled or operated by a same entity as that of network 105 or may be controlled or operated by one or more different entities. In one example, the networks 160 and 170 may comprise separate domains, e.g., separate routing domains as compared to the network 105. In one example, networks 160 and/or networks 170 may represent the Internet in general.

In one example, network 105 may transport traffic to and from user devices 141 and 142. For instance, the traffic may relate to communications such as voice telephone calls, video and other multimedia, text messaging, email, and so forth between the user devices 141 and 142, or between the user devices 141 and/or 142 and other devices that may be accessible via networks 160 and 170. User devices 141 and 142 may comprise, for example, cellular telephones, personal computers, other wireless and wired computing devices, private branch exchanges, customer edge (CE) routers, media terminal adapters, cable boxes, home gateways and/or routers, and so forth.

As stated above, network 105 comprises a WDM network (e.g., a dense wavelength division multiplexing (DWDM) network). Accordingly, in one example, the nodes 131-137 may include optical components, such as ROADMs, and the links between nodes 131-137 may comprise fiber optic cables. For ease of illustration, a portion of the links is specifically labeled as links 120-129. Inset 101 illustrates a portion of the network 105 comprising nodes 136 and 137, and links 125-129. As shown in inset 101, node 136 includes a ROADM 191 coupled to links 125, 126, and 128, a plurality of add/drop ports 194, and a router 193 coupled to the ROADM 191 via one of the plurality of add/drop ports 194 and a transceiver 192. Similarly, node 137 includes a ROADM 195 coupled to links 126, 127, and 129, a plurality of add/drop ports 198, and a router 197 coupled to ROADM 195 via one of the plurality of add/drop ports 198 and a transceiver 196. ROADMs 191 and 195 may comprise colorless ROADMs, directionless ROADMs, colorless and directionless ROADMs (CD ROADMs), a contentionless ROADM, e.g., a colorless, directionless, and contentionless (CDC) ROADM, and so forth.

It should be noted that in each of nodes 136 and 137, any number of routers, switches, application servers, and the like may be connected to one of the plurality of add/drop ports 194 or plurality of add/drop ports 198, e.g., via additional transceivers. In addition, in other examples, additional components, such as additional ROADMs, may be connected to one of the plurality of add/drop ports 194 or plurality of add/drop ports 198. For instance, in another example, node 137 may include a number of ROADMs and other components that are interconnected to provide a higher degree node. It should also be noted that nodes 131-135 may have a same or similar setup as nodes 136 and 137. In addition, in one example, any one or more of components 181-184 may also comprise an optical node with a same or similar setup as nodes 136 and 137.

As further illustrated in FIG. 1, network 105 includes a software defined network (SDN) controller 155 and a path computation element (PCE) 150. In one example, the SDN controller 155 may comprise a computing system or server, such as computing system 400 depicted in FIG. 4, and may be configured to provide one or more operations or functions in accordance with the present disclosure. For example, nodes 131-137 and components 181-184 may be controlled and managed by SDN controller 155. For instance, in one example, SDN controller 155 is responsible for such functions as provisioning and releasing instantiations of VNFs to perform the functions of routers, switches, and other devices, provisioning routing tables and other operating parameters for the VNFs, and so forth. Thus, various components of network 105 may comprise virtual network functions (VNFs) which may physically comprise hardware executing computer-readable/computer-executable instructions, code, and/or programs to perform various functions. For example, the functions of SDN controller 155 may include the selection of network function virtualization infrastructure (NFVI) from among various NFVI available at nodes 131-137 in network 105 to host various devices, such as routers, gateways, switches, route reflectors, firewalls, media servers, and so forth. To illustrate, routers 193 and 197 may physically reside on host devices that may be configured to be a firewall, a media server, a router, and so forth.

In addition, SDN controller 155 may also manage the operations of optical components of the network 105. For instance, SDN controller 155 may configure paths for wavelength connections via the network 105 by configuring and reconfiguring ROADMs at nodes 131-137 and components 181-184. For example, SDN controller 155 may provide instructions to control wavelength selective switches (WSSs) and transceivers within the ROADMs. In one example, SDN controller 155 may maintain communications with nodes 131-137 and components 181-184 via a number of control links 151 which may comprise secure tunnels for signaling communications over an underling IP infrastructure of network 105, e.g., including fibers/links 120-129, etc. In other words, the control links 151 may comprise virtual links multiplexed with transmission traffic and other data traversing network 105 and carried over a shared set of physical links. In one example, SDN controller 155 may be in communication with node controllers at each node 131-137 (and in one example at components 181-184). For example, node controllers 198 and 199 may be responsible for instantiating and releasing instances of virtual machines at nodes 136 and 137 respectively, and for configuring and reconfiguring operations of associated ROADMs, such as ROADMs 191 and 195. Thus, in one example, node controllers 198 and 199 may receive instructions for configuring and reconfiguring ROADMs 191 and 195 from SDN controller 155. In one example, the SDN controller 155 may also comprise a virtual machine operating on NFVI/host device(s), or may comprise a dedicated device. For instance, SDN controller 155 may be collocated with one or more VNFs, or may be deployed in a different host device or at a different physical location.

As further illustrated in FIG. 1, the network 105 also includes a path computation element (PCE) 150. In one example, PCE 150 may comprise a computing system or server, such as computing system 400 depicted in FIG. 4, and may be configured to provide one or more functions for determining reachability for a wavelength connection in a telecommunication network, as described herein. PCE 150 may be collocated with one or more of nodes 131-137, components 181-184, or SDN controller 155, or may be deployed at a different physical location. In one example, network 105 may comprise a distributed PCE environment with multiple PCEs responsible for different zones, e.g., segregated by geographic area, by functionality type, etc. Thus, for example, PCE 150 may be selected to manage path utilizations in the portion of network 105 relating to components 181-184 and nodes 131-137. For instance, the PCE 150 may be selected by the SDN controller 155.

As illustrated in FIG. 1, PCE 150 may be in communication with SDN controller 155 and may provide path compute decisions, such as reachability determinations, to the SDN controller 155. In turn, SDN controller 155 may provision wavelength connections via paths identified by PCE 150. For instance, SDN controller 155 may receive a request to establish a wavelength connection from component 181 to component 184, e.g., to carry traffic between user devices 141 and 142. SDN controller 155 may then forward the request to PCE 150 to calculate a path. In accordance with the present disclosure, PCE 150 may perform one or more operations of the example method 200 of FIG. 2, described in greater detail below. For illustrative purposes, PCE 150 may consider a candidate path comprising links 120, 121, 122, 123, and 124, and may make a reachability determination as part of a path computation process. If the path comprising links 120, 121, 122, 123, and 124 is determined to be "reachable" and if the path satisfies other criteria, such as being a least cost path, or a path that supports a least cost route as computed at a higher layer (e.g., for IP or IP/MPLS routing), the PCE 150 may return the path to SDN controller 155 for deployment. SDN controller 155 may then communicate with the nodes 131, 132, 133, and 135, and components 181 and 184 to configure ROADMs to maintain a wavelength connection over the path. It should be noted that although nodes 131, 132, 133, and 135 may include routers operating in the non-optical domain, a wavelength connection via the path comprising links 120, 121, 122, 123, and 124 may be optically switched through ROADMs at nodes 131, 132, 133, and 135 (and bypassing any routers (e.g., Layer 3 routers) or non-optical switches) that may be present at the respective nodes. In one example, components 181 and 184 may be configured to add and drop the wavelength of the wavelength connection and to perform optical-electrical conversion and vice versa, e.g., via a transceiver coupled to an add/drop port of a ROADM therein.

In this regard, PCE 150 may store various data in connection with managing path utilizations for telecommunication network tunnels. For instance, PCE 150 may maintain a topology information block (TIB) that includes records for various links/fibers between the nodes 131-137 and components 181-184 in network 105, such as the wavelengths available, the wavelengths assigned/in-use and/or the available/free wavelengths, the paths assigned to respective wavelengths, the fiber lengths, capacities, and ages, the transceiver performance capabilities of the various nodes, information regarding any protection scheme involving a fiber, and or any particular wavelengths that may be utilized over the fiber, and so forth.

It should be noted that the system 100 has been simplified. In other words, the system 100 may be implemented in a different form than that illustrated in FIG. 1. For example, the system 100 may be expanded to include additional networks, such as NOC networks, and additional network elements (not shown) such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions and/or combine elements that are illustrated as separate devices. For example, SDN controller 155, PCE 150, and/or other network elements may comprise functions that are spread across several devices that operate collectively as a SDN controller, a PCE, etc. In another example, PCE 150 and SDN controller 155 may be integrated into a single device. In another example, PCE 150 may maintain its own connections to nodes 131-137 and components 181-184 and may send instructions to various devices to configure paths for wavelength connections in accordance with the present disclosure. In another example, nodes 131-137 and/or components 181-184 may include fiber loss test sets (FLTSs), optical time domain reflectometer (OTDRs), PMD measurement devices, and the like which may be used to measure fiber loss and PMD over various links. In addition, it should be noted that transceivers within each of the nodes 131-137 and/or components 181-184 may measure pre-forward error correction (pre-FEC) bit error rates (BERs) over the various links/fibers, such as links 120-129. Thus, these and other modifications of the system 100 are all contemplated within the scope of the present disclosure.

Figure 2:
FIG. 2 illustrates a flowchart of a first example method for determining reachability for a wavelength connection in a telecommunication network.

FIG. 2 illustrates a flowchart of an example method 200 for determining reachability for a wavelength connection in a telecommunication network, in accordance with the present disclosure. In one example, steps, functions and/or operations of the method 200 may be performed by a network-based device, such as PCE 150 in FIG. 1, or PCE 150 in conjunction with other components of the system 100. In one example, the steps, functions, or operations of method 200 may be performed by a computing device or system 400, and/or processor 402 as described in connection with FIG. 4 below. For example, computing device or system 400 may represent a PCE, a SDN controller, a PCE integrated with a SDN controller, and so forth in accordance with the present disclosure. For illustrative purposes, the method 200 is described in greater detail below in connection with an example performed by a processor, such as processor 402. The method 200 begins in step 205 and proceeds to optional step 210 or to step 230.

At optional step 210, the processor may receive a request to establish a wavelength connection in the telecommunication network. In one example, the request to establish the wavelength connection comprises a request for a persistent connection, e.g., in contrast to a non-persistent connection. In one example, a persistent connection may be intended to remain active over the course of several months, several years, or even over decades, whereas a non-persistent connection may be temporary, such as for network testing, as a backup during network repairs or upgrades, for offloading during certain events, such as weather-related outages in an area, or for large transient spikes in traffic in an area, such as during mass sporting events, concerts, and the like. The request may be received from an operator terminal in a network operations center (NOC), e.g., from a terminal from network provisioning personnel, from a customer device, and so forth.

At optional step 220, the processor may select the path through the telecommunication network for the wavelength connection based upon a set of initial criteria (e.g., selecting the path as a candidate path). In one example, the path is selected by applying the set of initial criteria to a shortest path first algorithm. In one example, the set of initial criteria includes information for a topology of the telecommunication network and available wavelength resources on links in the telecommunication network. Other criteria may include: losses for nodes in the telecommunication network, available wavelength resources on links in the telecommunication network, and optical signal to noise ratios bit error rate measurements for the links in the telecommunication network (e.g., from times when the links were first deployed and before use for live traffic). Additional criteria may include geographic or other constraints for certain customer traffic, monetary constraints, class of service, etc. In another example, criteria can come into play after the reach determination, or may be weighting factors, in addition to the reachability determination as a weighting factor, in deciding between one path versus other paths, e.g., where the destination is reachable via the multiple paths.

At step 230, the processor calculates a fiber loss on a link in the telecommunication network, e.g., using optical power measurements. In one example, the link may comprise a link on the path that is selected at optional step 220. In this regard, it should be noted that in one example, fiber loss calculations may be made for multiple links in the path in connection with the method 200. In addition, fiber loss calculations may be made on a per-wavelength basis in each link. In one example, the fiber loss on the link is calculated from one or more optical power measurements on a wavelength that is not in use for user traffic data or network management data via the link. It should be noted that there may be multiple measurements on the same wavelength and on different wavelengths that can be used to inform the reachability determination and to set the margin, the end of life (EoL) acceptable loss, and/or the acceptable loss value R). In one example, the fiber loss on the link is measured/calculated via an optical time domain reflectometer (OTDR). In another example, the fiber loss on the link is measured/calculated via a fiber loss test set (FLTS). In accordance with the present disclosure, an OTDR or FLTS may be permanently attached to the telecommunication network and is in communication with the processor (and/or the device, such as a PCE, in which the processor is deployed). In other words, in one example, an OTDR or FLTS for use in present disclosure is not a portable device carried by a network engineer.

At step 240, the processor determines, based upon the fiber loss of the link that is calculated, that a destination node of a wavelength connection is not reachable via a path that includes the link. In one example, the determining is based upon a number of links in the path, an effective fiber loss for each link in the path, a penalty (or "loss penalty") for nodes in the path, and an acceptable loss value, e.g., a single link acceptable loss value. For instance, the wavelength connection may be a persistent wavelength connection that has been requested to be established. In one example, the determining that the destination node of a wavelength connection is not reachable is based upon Equation 1 or Equation 2 above, or a variation thereof. In one example, nodes may also include additional components that are not directly implicated in reachability determinations, such as regenerators, IP/MPLS routers, and so forth. In one example, the fiber loss for each link is specific to a wavelength of the wavelength connection. For instance, as mentioned above, in one example step 230 may include calculating a fiber loss for multiple links (i.e., fibers) in a path and on various wavelengths over each link.

In one example, the acceptable loss value is based on an end of life (EoL) acceptable loss for a single link and a margin. In one example, the EoL acceptable loss is determined based upon a trend of increasing fiber loss values from fiber loss calculations on at least one link in the path, based upon BER measurements, based upon PMD measurements, etc. It should be noted that in one example, no distinction is made between EoL acceptable loss and margin. For example, an acceptable loss value (inclusive of margin) may be initially set based upon fiber loss calculations, BER measurements, PMD measurements, etc. for at least one of: other links in a same geographic area as the link, other links in a same temperature or climate zone as the link, or other links having a same deployment type as the link. The deployment type may comprise, for example: buried (with further distinctions based upon the type of burial), or above ground. Alternatively, or in addition, initial estimates may be taken from measurements on other links comprising fiber having a same manufacturer, model, or production run as the fiber link.

It should be noted that in one example the reachability determination of step 240 may utilize "effective" fiber loss for each link in the path, e.g., fiber loss that is estimated based upon statistics and trends seen in the fiber loss data over long-term measurements and/or calculated using loss data on fibers from the same cable, loss data on other fibers used by the system, loss estimates based on known properties of the fiber, and loss data from other systems with the same or similar equipment.

At step 250, the processor performs a remedial action in response to determining that the destination node of the wavelength connection is not reachable via the path. In one example, the remedial action comprises reducing a bitrate for the wavelength connection as compared to a requested bitrate contained in the request to establish the wavelength connection and establishing the wavelength connection via the path. In another example, the remedial action comprises adding a regenerator to the path and establishing the wavelength connection via the path. In one example, the regenerator may comprise an opto-electronic component of a node in the path. Thus, the establishment of the wavelength connection via the path may include a dropping of the wavelength via a ROADM of the node and an adding of the wavelength back to the path after regeneration. In this regard, at step 250 the processor may further send an instruction to the node, the ROADM of the node, and/or the regenerator of the node in order to include the regenerator in the path. In yet another example, the remedial action comprises both reducing a bitrate for the wavelength connection and adding a regenerator to the path, and then establishing the wavelength connection via the path. In still another example, the remedial action comprises selecting a different path for the wavelength connection. In one example, the remedial action may further comprise establishing the wavelength connection via the different path.

Following step 250, the method 200 may proceed to optional step 255, optional step 260, or step 295.

At optional step 255, the processor may adjust the acceptable loss value (and/or the margin) for determining whether the destination node of the wavelength connection is reachable based upon a variability in a plurality of calculations of the fiber loss on the link. In one example, the variability may comprise a seasonal variability, e.g., different calculations or ranges of calculations of fiber loss at different times of the year. For instance, as described above, an acceptable loss value (inclusive of margin) may be initially set based upon fiber loss calculations, BER measurements, PMD measurements, etc. for at least one of: other links in a same geographic area as the link, other links in a same temperature zone as the link, or other links having a same deployment type as the link. However, the acceptable loss value may be reduced when variability is higher.

At optional step 260, the processor may receive an additional request to establish an additional wavelength connection in the telecommunication network comprising a non-persistent connection (e.g., in contrast to the wavelength connection discussed above, which may comprise a permanent wavelength connection). Following optional step 260, the method 200 may proceed to optional step 270 or to optional step 280.

At optional step 270, the processor may select an additional path through the telecommunication network for the additional wavelength connection based upon a set of initial criteria. The set of initial criteria may the same or similar to the set of initial criteria as described above in connection with optional step 220.

Following optional step 270, the method 200 may proceed to optional step 280 or to optional step 290.

At optional step 280, the processor may determine that a destination node of the additional wavelength connection is reachable via an additional path that includes the link based upon the fiber loss of the link that is measured. In one example, the determining that the destination node of the additional wavelength connection is reachable via the additional path that includes the link is based upon a reduced margin and/or acceptable loss value as compared to the margin and/or the acceptable loss value that is used for the determining that the destination node of the wavelength connection is not reachable via the path that includes the link.

At optional step 290, the processor may establish the additional wavelength connection via the additional path. In one example, the additional wavelength connection is established via the additional path without performing a reachability calculation for the additional wavelength connection via the additional path (e.g., omitting optional step 280).

Following optional step 290 the method 200 may proceed to step 295. At step 295, the method 200 ends.

It should be noted that the method 200 may be expanded to include additional steps. For instance, in one example the processor may repeat one or more steps of the method 200 by receiving a further request for a persistent or a non-persistent wavelength connection. In another example, the method 200 may include operations for performing a least cost routing or other path compute task. In still another example, the method 200 may include operations for collecting historical data for PMD, pre-FEC BER, and fiber loss from various network components. Thus, these and other modifications are all contemplated within the scope of the present disclosure.

Figure 3:
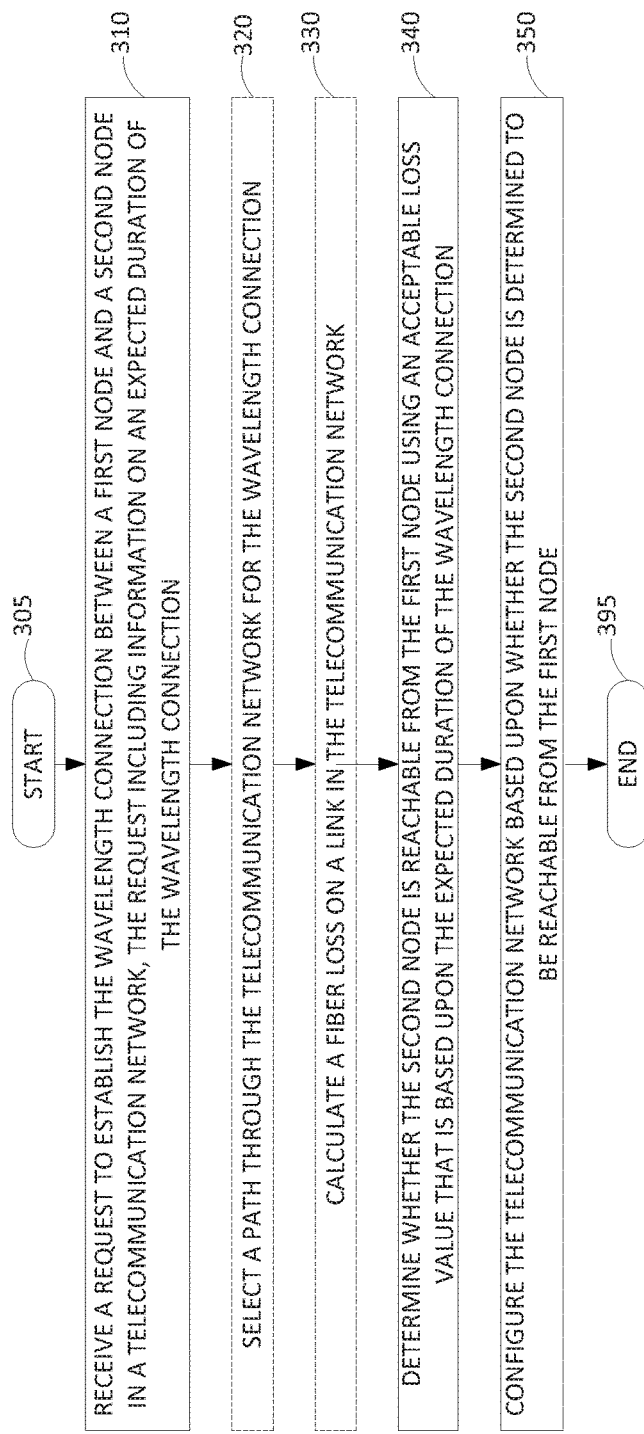
FIG. 3 illustrates a flowchart of a second example method for determining reachability for a wavelength connection in a telecommunication network.

FIG. 3 illustrates a flowchart of an example method 300 for determining reachability for a wavelength connection in a telecommunication network, in accordance with the present disclosure. In one example, steps, functions and/or operations of the method 300 may be performed by a network-based device, such as PCE 150 in FIG. 1, or PCE 150 in conjunction with other components of the system 100. In one example, the steps, functions, or operations of method 300 may be performed by a computing device or system 400, and/or processor 402 as described in connection with FIG. 4 below. For illustrative purposes, the method 300 is described in greater detail below in connection with an example performed by a processor, such as processor 402. The method 300 begins in step 305 and proceeds to step 310.

At step 310, the processor receives a request to establish a wavelength connection between a first node and a second node in a telecommunication network. In one example, the request to establish the wavelength connection comprises a request for a persistent connection or a request for a non-persistent connection. Accordingly, the request may include information on an expected duration of the wavelength connection. For instance, the request may explicitly indicate whether the connection is a long-duration connection (broadly a "persistent" connection) or for a short-duration connection (broadly a "non-persistent" connection). In another example, the request may indicate an expected duration, and the processor may apply a duration threshold to determine whether the requested wavelength connection is for a persistent wavelength connection or for a non-persistent wavelength connection. The request may be received from an operator terminal in a network operations center (NOC), e.g., from a terminal from network provisioning personnel, from a customer device, and so forth.

At optional step 320, the processor may select the path through the telecommunication network for the wavelength connection based upon a set of initial criteria (e.g., selecting the path as a candidate path). In one example, optional step 320 may comprise the same or similar operations as optional step 220 of the example method 200 discussed above.

At optional step 330, the processor may calculate a fiber loss on a link in the telecommunication network. In one example, the link may comprise a link on the path that is selected at optional step 320. In this regard, it should be noted that in one example, fiber loss calculations may be made for multiple links in the path in connection with the method 300. In one example, optional step 330 may comprise the same or similar operations as optional step 230 of the example method 200 discussed above.

At step 340, the processor determines whether the second node is reachable from the first node using an acceptable loss value that is based upon the expected duration of the wavelength connection. For instance, the processor may use a reduced margin and/or acceptable loss value in connection with a request to establish a persistent wavelength connection as compared to the margin and/or the acceptable loss value the processor may use in connection with a request to establish a non-persistent wavelength connection. In one example, the determining whether the second node is reachable from the first node using the acceptable loss criteria is based upon Equation 1 or Equation 2 above, or a variation thereof. In one example, step 340 may comprise the same or similar operations as step 240 of the example method 200 discussed above.

In one example, at step 340 the processor may omit a reachability determination when the request is a request to establish a non-persistent wavelength connection. For instance, the processor may simply attempt to establish the wavelength connection over a path that may be selected at optional step 320. In such an example, the determining whether the second node is reachable (wherein the reachability determination is based upon the expected duration of the wavelength connection) may comprise utilizing the wavelength connection and determining whether the performance complies with a performance requirement (e.g., an acceptable pre-FEC BER, an acceptable BER post-FEC, and so forth).

At step 350, the processor configures the telecommunication network based upon whether the second node is determined to be reachable from the first node. For instance, when it is determined that the second node is reachable from the first node, the wavelength connection may be deployed over the path. In this regard, at step 350 the processor may further send an instruction to the first node, the second node, and/or one or more additional nodes in the path to route the wavelength connection via the path. On the other hand, when it is determined that the second not is not reachable from the first node via the path, step 350 may comprise reducing a bitrate for the wavelength connection over the path, adding a regenerator to the path, or both reducing an bitrate and adding a regenerator to the path. In still another example, step 350 may comprises selecting a different path for the wavelength connection, determining whether the second node is reachable from the first node via the different path, establishing the wavelength connection via the different path, and so on.

Following step 350 the method 300 may proceed to step 395. At step 395, the method 300 ends.

It should be noted that the method 300 may be expanded to include additional steps. For instance, in one example the processor may repeat one or more steps of the method 300 by receiving a further request for a persistent or a non-persistent wavelength connection. In another example, the method 300 may include operations for performing a least cost routing or other path compute task. In still another example, the method 300 may include operations for collecting historical data for PMD, pre-FEC BER, and fiber loss from various network components. Thus, these and other modifications are all contemplated within the scope of the present disclosure.

In addition, although not specifically specified, one or more steps, functions or operations of the method 200 or the method 300 may include a storing, displaying and/or outputting step as required for a particular application. In other words, any data, records, fields, and/or intermediate results discussed in the example method 200 or method 300 can be stored, displayed and/or outputted to another device as required for a particular application. Furthermore, steps or blocks in FIG. 2 or 3 that recite a determining operation or involve a decision do not necessarily require that both branches of the determining operation be practiced. In other words, one of the branches of the determining operation can be deemed as an optional step. In addition, one or more steps, blocks, functions, or operations of the above described method 200 or method 300 may comprise optional steps, or can be combined, separated, and/or performed in a different order from that described above, without departing from the example embodiments of the present disclosure.

Figure 4:
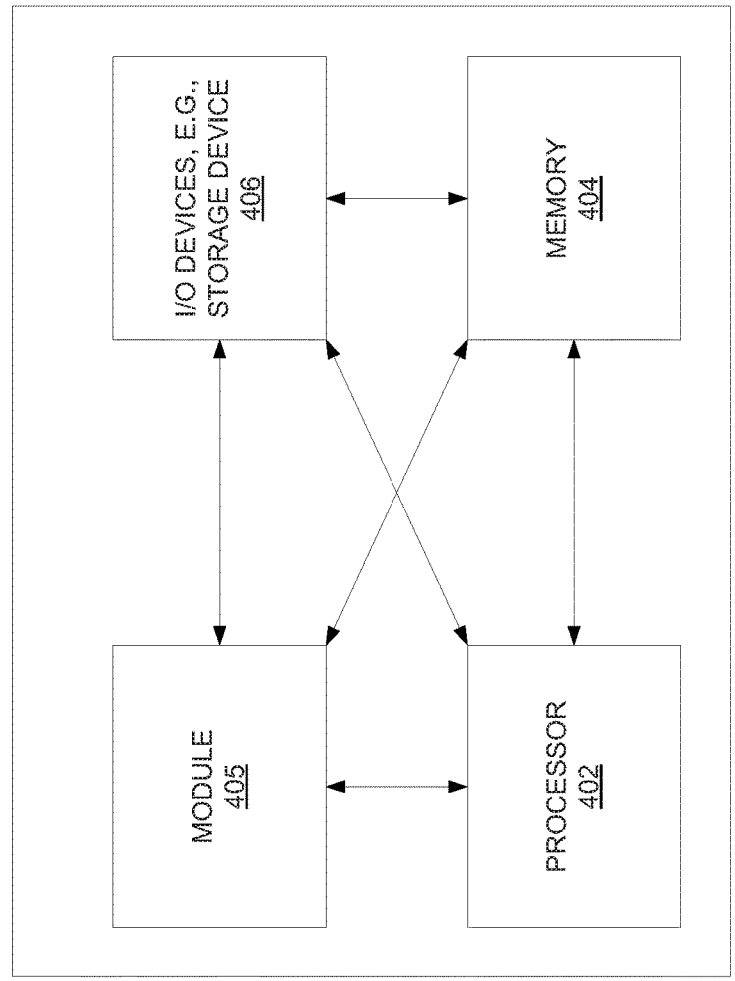
FIG. 4 illustrates an example high-level block diagram of a computer specifically programmed to perform the steps, functions, blocks, and/or operations described herein.

FIG. 4 depicts a high-level block diagram of a computing device specifically programmed to perform the functions described herein. As depicted in FIG. 4, the system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for determining reachability for a wavelength connection in a telecommunication network, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 or the method 300 as discussed above is implemented in a distributed or parallel manner for a particular illustrative example, i.e., the steps of the above method 200 or method 300, or the entire method 200 or method 300 is implemented across multiple or parallel computing device, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200 or method 300. In one example, instructions and data for the present module or process 405 for determining reachability for a wavelength connection in a telecommunication network (e.g., a software program comprising computer-executable instructions) can be loaded into memory 404 and executed by hardware processor element 402 to implement the steps, functions or operations as discussed above in connection with the illustrative method 200 and/or method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for determining reachability for a wavelength connection in a telecommunication network (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
   calculating, by a processor deployed in a telecommunication network using optical power measurements, a fiber loss on a link in the telecommunication network;
   determining, by the processor, that a destination node of a wavelength connection is not reachable via a path that includes the link based upon the fiber loss of the link that is calculated, wherein the determining is based upon:
   a number of links in the path;
   an effective fiber loss for each link in the path;
   a penalty for nodes in the path; and
   an acceptable loss value; and
   performing, by the processor, a remedial action in response to determining that the destination node of the wavelength connection is not reachable via the path.

2. The method of claim 1, wherein the determining that the destination node of the wavelength connection is not reachable is based upon:

$$\left\| 10 \times \left[ \log_{10}\left\{ \sum_{i=1}^{n} (1/l_i) \right\} \right] \right\| + (n-1)h \leq \|R\|$$

where n is the number of links in the path, $l_i$ is the effective fiber loss for each link i, h is the penalty for nodes in the path, and R is the acceptable loss value.

3. The method of claim 1, wherein the determining that the destination node of the wavelength connection is not reachable is based upon:

$$\left\| 10 \times \left[ \log_{10}\left\{ \sum_{i=1}^{n} (1/l_i) \right\} \right] \right\| + mh_{AMP} + (n-1)h_{ROADM} \leq \|R\|$$

where n is the number of links in the path, $l_i$ is the effective fiber loss for each link i, m is a number of amplifiers in the path, $h_{AMP}$ is a loss for optical amplifiers in the path, $h_{ROADM}$ is a loss for reconfigurable optical add-drop multiplexers in the path, and R is the acceptable loss value.

4. The method of claim 1, wherein the effective fiber loss for each link is specific to a wavelength of the wavelength connection.

5. The method of claim 1, wherein the acceptable loss value is based on an end of life acceptable loss for a single link and a margin.

6. The method of claim 1, further comprising:
adjusting the acceptable loss value based upon a variability in a plurality of calculations of the fiber loss on the link.

7. The method of claim 1, wherein the remedial action comprises:
adding a regenerator to the path; and
establishing the wavelength connection via the path.

8. The method of claim 1, wherein the remedial action comprises:
reducing a bitrate for the wavelength connection as compared to a requested bitrate contained in a request to establish the wavelength connection; and
establishing the wavelength connection via the path.

9. The method of claim 1, wherein the remedial action comprises:
selecting a different path for the wavelength connection.

10. The method of claim 1, further comprising:
receiving a request to establish the wavelength connection in the telecommunication network; and
selecting the path through the telecommunication network for the wavelength connection based upon a set of initial criteria.

11. The method of claim 10, wherein the path is selected by applying the set of initial criteria to a shortest path first algorithm, wherein the set of initial criteria includes information for:
a topology of the telecommunication network; and
available wavelength resources on links in the telecommunication network.

12. The method of claim 10, wherein the request to establish the wavelength connection comprises a request for a persistent connection.

13. The method of claim 12, further comprising:
receiving an additional request to establish an additional wavelength connection in the telecommunication network comprising a non-persistent connection;
determining that a destination node of the additional wavelength connection is reachable via an additional path that includes the link based upon the fiber loss of the link that is calculated, wherein the determining that the destination node of the additional wavelength connection is reachable via the additional path that includes the link is based upon a reduced acceptable loss value as compared to the acceptable loss value that is used for the determining that the destination node of the wavelength connection is not reachable via the path that includes the link; and
establishing the additional wavelength connection via the additional path.

14. The method of claim 12, further comprising:
receiving an additional request to establish an additional wavelength connection in the telecommunication network comprising a non-persistent connection;
selecting an additional path through the telecommunication network for the additional wavelength connection based upon the set of initial criteria; and
establishing the additional wavelength connection via the additional path without performing a reachability calculation for the additional wavelength connection via the additional path.

15. The method of claim 1, wherein the calculating the fiber loss on the link comprises an optical power measurement on a wavelength that is not in use for user traffic data or network management data via the link.

16. The method of claim 1, wherein the fiber loss on the link is calculated via at least one of:
an optical time domain reflectometer; or
a fiber loss test set.

17. A non-transitory computer-readable medium storing instructions which, when executed by a processor deployed in a telecommunication network, cause the processor to perform operations, the operations comprising:
calculating, using optical power measurements, a fiber loss on a link in the telecommunication network;
determining that a destination node of a wavelength connection is not reachable via a path that includes the link based upon the fiber loss of the link that is calculated, wherein the determining is based upon:
a number of links in the path;
an effective fiber loss for each link in the path;
a penalty for nodes in the path; and
an acceptable loss value; and
performing a remedial action in response to determining that the destination node of the wavelength connection is not reachable via the path.

18. A device comprising:
a processor deployed in a telecommunication network; and
a computer-readable medium storing instructions which, when executed by the processor, cause the processor to perform operations, the operations comprising:
calculating, using optical power measurements, a fiber loss on a link in the telecommunication network;
determining that a destination node of a wavelength connection is not reachable via a path that includes the link based upon the fiber loss of the link that is calculated, wherein the determining is based upon:
a number of links in the path;
an effective fiber loss for each link in the path;
a penalty for nodes in the path; and
an acceptable loss value; and
performing a remedial action in response to determining that the destination node of the wavelength connection is not reachable via the path.

19. The device of claim 18, wherein the remedial action comprises:
adding a regenerator to the path; and
establishing the wavelength connection via the path.

20. The device of claim 18, wherein the remedial action comprises:
reducing a bitrate for the wavelength connection as compared to a requested bitrate contained in a request to establish the wavelength connection; and
establishing the wavelength connection via the path.

* * * * *